(12) United States Patent
May et al.

(10) Patent No.: US 7,661,004 B2
(45) Date of Patent: Feb. 9, 2010

(54) AUTOMATIC POWER-UP PORTABLE ELECTRONIC DEVICE BASED ON TIME-DEPENDENT EVENT

(75) Inventors: Darrell R. May, Waterloo (CA); Tony Burns, Waterloo (CA); Andrew Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 479 days.

(21) Appl. No.: 11/554,168

(22) Filed: Oct. 30, 2006

(65) Prior Publication Data

US 2008/0104421 A1    May 1, 2008

(51) Int. Cl.
*G06F 1/32* (2006.01)

(52) U.S. Cl. .................. 713/323; 455/574

(58) Field of Classification Search .............. 713/323, 713/320; 455/127.5, 574
See application file for complete search history.

(56) References Cited

U.S. PATENT DOCUMENTS

| | | | |
|---|---|---|---|
| 6,457,134 B1 * | 9/2002 | Lemke et al. | 713/323 |
| 6,816,977 B2 * | 11/2004 | Brakmo et al. | 713/323 |
| 6,865,683 B2 * | 3/2005 | Taylor et al. | 713/310 |

* cited by examiner

*Primary Examiner*—Thuan N Du
(74) *Attorney, Agent, or Firm*—Perry & Currier Inc.

(57) ABSTRACT

A method of controlling a portable electronic device includes receiving a power-down command, determining an automatic power-up date and time based on an earliest one of a next preset power-up and a next time-dependent event reminder, entering a power-down state, monitoring a date and time, and automatically powering up at the automatic power-up date and time.

10 Claims, 6 Drawing Sheets

MON, AUG. 14, 2006
*12:47 PM*

Powering Off

Next On Time:

Tues. Aug. 15, 2006          6:45AM

Reminder:

9:00 Flight

FIG. 6

AUTOMATIC POWER-UP PORTABLE ELECTRONIC DEVICE BASED ON TIME-DEPENDENT EVENT

FIELD OF TECHNOLOGY

The present disclosure relates to automatic power-up of a portable electronic device from a low power or power off state.

BACKGROUND

Portable electronic devices including, for example, smart telephones and wireless PDAs are becoming increasingly common and typically integrate functions of personal information management such as calendaring and data communications such as email, World Wide Web browsing and telecommunications in a single device. Such devices run on a wide variety of networks from data-only networks such as Mobitex and DataTAC to complex voice and data networks such as GSM/GPRS, CDMA, EDGE, UMTS and CDMA2000 networks.

Such portable electronic devices commonly rely on battery power. To conserve battery power, users frequently turn off their portable electronic device during periods of non-use, for example, while the user is sleeping. Certain devices permit the user to set automatic off and automatic on times. In this case, the portable electronic device automatically powers down to a power-off or low-power state at a user set time and automatically powers up at a user set time. For example, the portable electronic device can be set to power down at 11:00 PM each night and power up at 7:00 AM each morning, thereby saving the user from having to remember to turn on or off the portable electronic device to conserve battery power. Of course even with such automatic settings, a user may still use a power-off button during certain periods of inactivity. When in the power-off or low-power state, however, a preset alarm time may be missed. For example, a calendar event reminder such as an appointment reminder previously set to go off at 6:30 AM may be missed if the device is in the low-power state until 7:00 AM.

Improvements in methods and apparatus for powering up a portable electronic device are desirable.

BRIEF DESCRIPTION OF THE DRAWINGS

The embodiments described herein will be better understood with reference to the following Figures, in which:

FIG. 6 is another exemplary screen displayed on the display of the portable electronic device according to one exemplary embodiment.

DETAILED DESCRIPTION OF THE EMBODIMENTS

Figure 1:
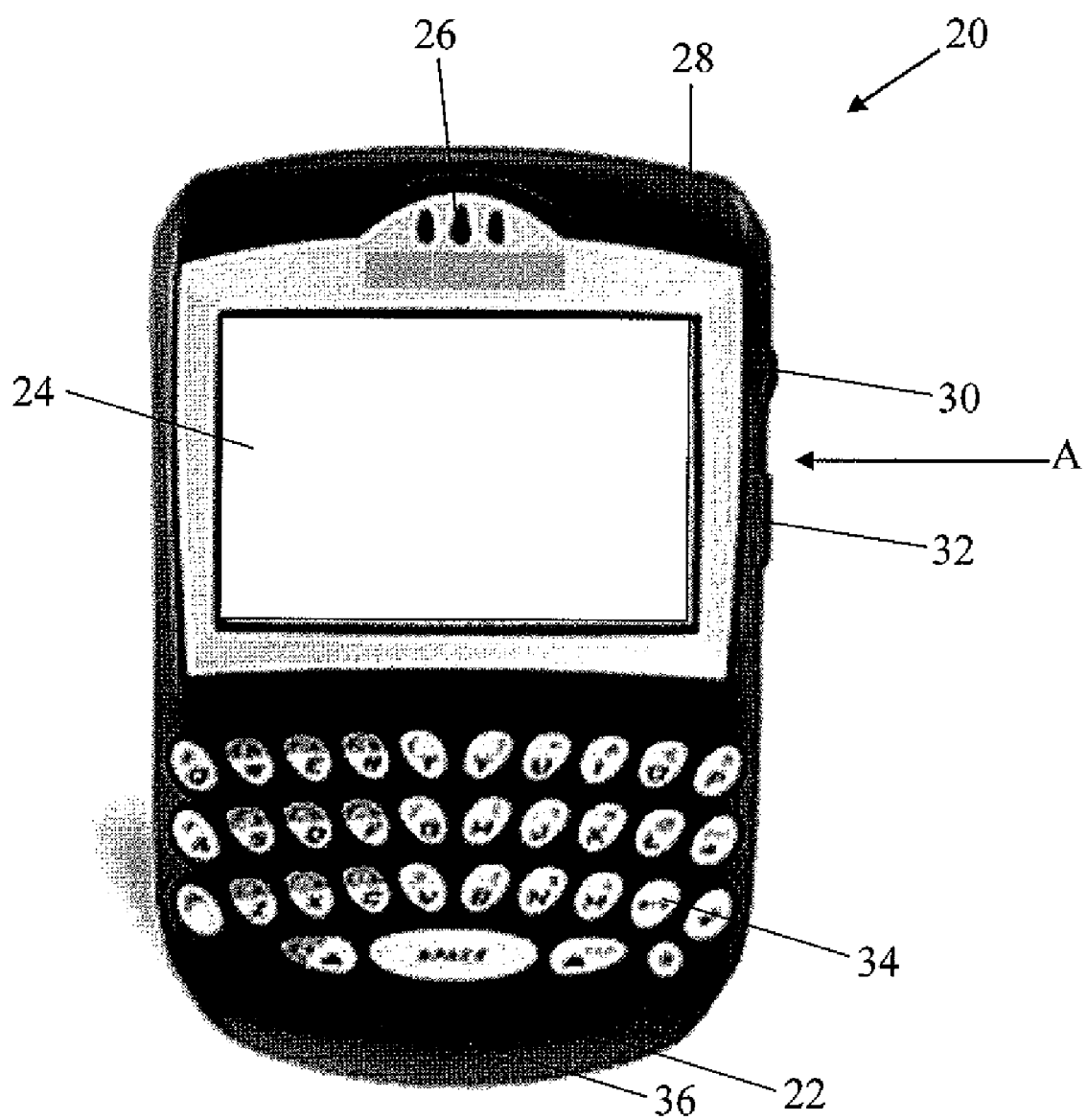
FIG. 1 is a front view of an exemplary portable electronic device.

Referring to FIG. 1, an exemplary portable electronic device in accordance with an embodiment is indicated generally by the numeral 20. In the present embodiment, the portable electronic device 20 is based on the computing environment and functionality of a hand-held wireless communication device. It will be understood, however, that the electronic device is not limited to a hand-held wireless communication device. Other electronic devices are possible, such as cellular telephones, smart telephones, and laptop computers. Referring again to the present embodiment, the portable electronic device 20 includes a housing 22 that frames an LCD display 24, a speaker 26, an LED indicator 28, a trackwheel 30, an exit key 32, a keypad 34, and a microphone 36. The trackwheel 30 and the exit key 32 can be inwardly depressed along the path of arrow "A" as a means to provide additional user-input. The housing 22 is made from a suitable material as will occur to those skilled in the art and can be stored, for example, in a holster (not shown) that includes an attachment for attaching to a user's belt.

Figure 2:
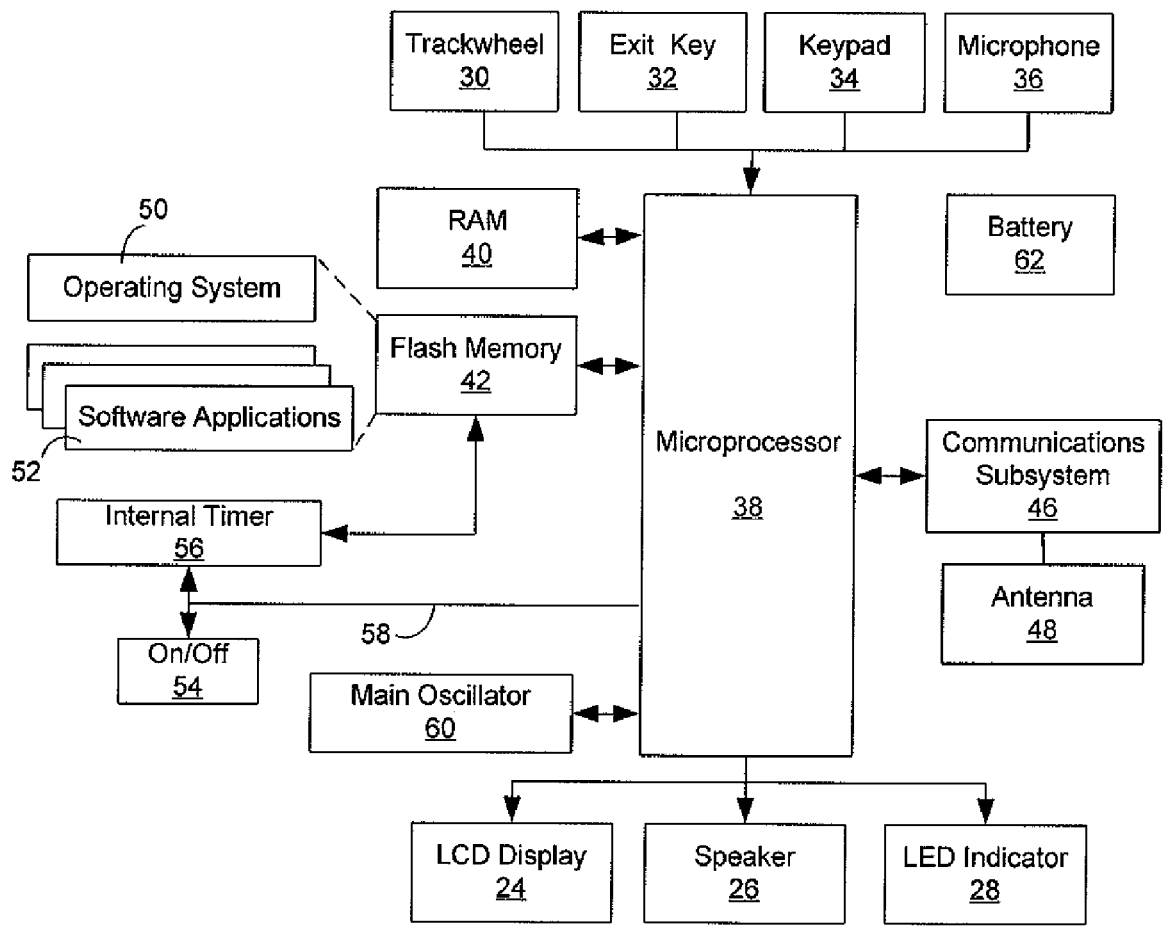
FIG. 2 is a block diagram of certain components, including internal components within the portable electronic device of FIG. 1.

Referring now to FIG. 2, a block diagram of certain components, including internal components within the portable electronic device 20, is shown. The portable electronic device 20 is based on a microcomputer that includes a microprocessor 38 connected to a random access memory (RAM) unit 40 and a persistent storage device, which in the present embodiment is a flash memory 42 that is responsible for various non-volatile storage functions of the portable electronic device 20. Operating system software 50 executable by the microprocessor 38 is stored in the flash memory 42. It will be appreciated, however, that the operating system software 50 can be stored in other types of memory such as read-only memory (ROM). In the present embodiment, software applications 52 including Personal Information Manager (PIM) applications are stored in the persistent storage device 42 for execution by the microprocessor 38 for carrying out various functions. The microprocessor 38 receives input from various input devices including the trackwheel 30, the exit key 32, and the keypad 34, and outputs to various output devices including the LCD display 24, the speaker 26 and the LED indicator 28. The microprocessor 38 also interacts with on/off circuitry 54 for powering up the portable electronic device 20 and powering down the portable electronic device 20, and an internal timer 56.

In the present embodiment, the portable electronic device 20 is a two-way RF communication device having voice and data communication capabilities. The portable electronic device 20 also includes Internet communication capabilities. Two-way RF communication is facilitated by a communications subsystem 46 that is used to connect to and operate with a data-only network such as Mobitex or DataTAC, or a complex voice and data network such as a GSM/GPRS, CDMA, EDGE, UMTS or CDMA2000 network, via the antenna 48.

As indicated above, the flash memory 42 stores a plurality of applications executable by the microprocessor 38 that enable the portable electronic device 20 to perform certain operations including the communication operations referred to above. Applications software is provided including, for example, PIM applications such as an email application, an address book application, a calendar application, and a tasks application, as well as other applications such as a Web browser application, and an options application and a profiles application.

In a data communication mode, a received signal such as a text message or Web page download is processed by the communications subsystem 46 and input to the microprocessor 38 for further processing of the received signal for output to the LCD display 24. A user of the portable electronic device 20 can also compose data items within a software application such as an e-mail messaging application using the keypad 34, for example, in conjunction with the trackwheel 30 and the LCD display 24. Such composed items can then be transmitted over the communications network through the communications subsystem 46 and antenna 48.

Although not shown, a short-range communications subsystem can also be provided for communication between the portable electronic device 20 and other devices or systems. Such short-range communications subsystems include, for example, an infrared device as well as associated components and circuitry, and a Bluetooth™ communication system.

A rechargeable battery 62 such as a Li-ion battery is provided for powering the portable electronic device 20.

To conserve energy stored in the battery 62, the user can power down the portable electronic device 20 to a power-off or low-power state by pressing a power on/off button (not shown). Alternatively, the device can be powered up or powered down using a combination of buttons that activate the on/off circuitry 54. In the present embodiment, pressing the on/off button actuates the on/off circuitry 54, which delivers an interrupt on interrupt line 58 shown in FIG. 2, to either power up the portable electronic device 20 when it is in a power-down state, or to power down the portable electronic device 20 when it is in a power-up state. It will be appreciated that the on/off circuitry can be implemented in other suitable ways, as will be understood by those skilled in the art.

As indicated above, the portable electronic device 20 includes an internal timer 56 that can also deliver an interrupt on the interrupt line 58 to power up the portable electronic device 20 when the portable electronic device 20 is in a power-down state and to power down the device when the portable electronic device 20 is in the power-up state. The internal timer 56 is responsible for keeping track of the date and time even when the portable electronic device 20 is turned off. Thus, even though the portable electronic device 20 is "turned off", a small amount of energy from the battery 62 is used to maintain power to certain components to enable the portable electronic device 20 to operate. For example, power is maintained to the internal timer 56 and to the microprocessor to maintain the date and time, and to maintain other functions such as the ability to recognize a stimulus such as activation of the power on/off button. The internal timer 56 can be any suitable device or devices such as a dedicated integrated circuit and an oscillator for generating a clock signal. An oscillator that provides a low-frequency clock signal is preferable so that the internal timer 56 consumes a relatively low amount of power to further conserve the battery 62.

A main oscillator 62 is also provided for generating a relatively high-frequency (MHz) clock signal compared to that generated by the oscillator that is part of the internal timer 56 (tens of kHz). The main oscillator 62 includes circuitry that operates when the portable electronic device is on for providing a clock signal to the microprocessor 38 and other components.

Figure 3:
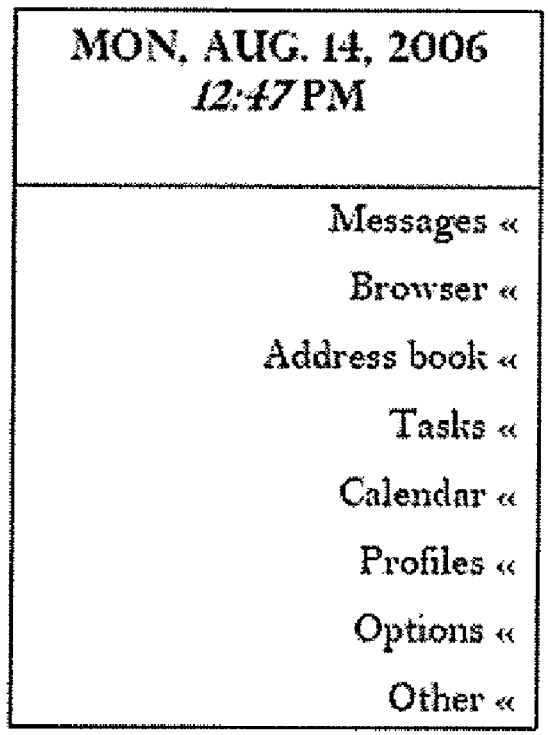
FIG. 3 is an exemplary menu screen displayed on a display of the portable electronic device of FIG. 1.

Referring to FIG. 3, there is shown an exemplary menu screen that is displayed on the LCD display 24 of the portable electronic device 20. The exemplary menu screen includes a display clock that is updated according to the main oscillator circuitry 62, and a list of applications including an email messaging application, a Web browser, an Address book, a Tasks application, a Calendar application, a Profiles application and an Options application. Each of the displayed applications in the list is selectable by, for example, scrolling to the desired application using the trackwheel 30 and pressing inwardly on the trackwheel 30 in the direction of arrow "A".

It will be appreciated that the Calendar application is used for providing a graphical user interface (GUI) for the user to create calendar events and for storage of the calendar events in a database at the flash memory 42, when executed by the processor 38. The Calendar application is used for creating, displaying and storing calendar events such as appointments, lectures, exams, movies, meetings, performances, dinners, ceremonies, etc. as described below. Each calendar event includes a variety of information including a name, a date and time of the event as well as a user-selectable reminder time for the event. For example, the calendar event can include a reminder set for 15 minutes prior to the start time of the event. A reminder such as an audible alarm is then provided 15 minutes prior to the start time of the event, to thereby remind the user. The reminder type can also be selected or changed by the user using, for example, the profiles application. For example, the user can select from a number of audible alarms, or can select a visual alarm or even a kinetic alarm, such as a vibration.

Similarly, the Tasks application is used for providing a graphical user interface (GUI) for the user to create tasks and for storage of the tasks in a database at the flash memory 42, when executed by the processor 38. Each task also includes a variety of information including, for example, a subject, a due date and a reminder date and time for the task. Thus, a reminder can be set for reminding the user of the task to be completed.

Both the calendar events and the tasks are referred to herein as time-based events as both are based on time and are stored in databases that can be displayed in a calendar view such as a day view, a week view, a month view or an agenda view that allow the user to view the time-based events.

Figure 4:
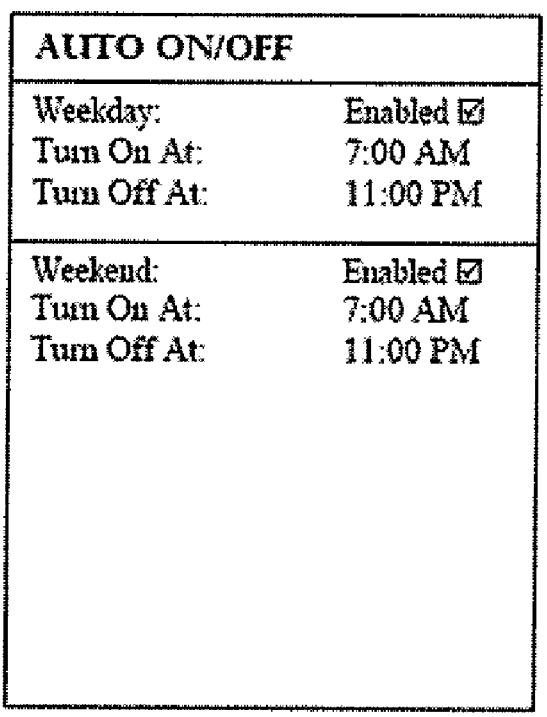
FIG. 4 is another exemplary screen showing automatic on and off settings for the portable electronic device.

To aid in conserving energy stored in the battery 62, the portable electronic device 20 includes an Options application as shown in FIG. 3. The Options application includes an automatic on/off programming mode for user activation and deactivation to automatically power up the portable electronic device 20 and automatically power down the portable electronic device at user-definable times. The user accesses the automatic on/off programming mode by selection of the Options application, followed by user selection of the automatic on/off settings from a menu list of options for the portable electronic device 20. The user then enables or disables the automatic on/off as desired, by user selection and changing of the Enabled field shown in FIG. 4. Such user selection and changing can be accomplished using, for example, the trackwheel 30. The user then enters the data for the power-up and power-down cycle by selecting the indicated times using the trackwheel 30 and changing to the desired times using either the trackwheel 30 or the keypad 34. As shown, a power-up and power-down cycle can be selected for the weekdays (Monday to Friday) and a different power-up and power-down cycle can be selected for the weekends (Saturday and Sunday), thereby allowing the user to modify the power-up and power-down cycles based on the user's needs. In the exemplary screen shown in FIG. 4, the automatic power-up and power-down cycles are enabled for both the weekdays and for the weekends. The device is scheduled to power down (turn off) at 11:00 P.M. each evening on both weekdays and weekends and to power up (turn on) at 7:00 A.M. on the weekend. Although indicated as a turn off time, it will be appreciated that a small amount of energy from the battery 62 is used to maintain power to certain components to enable the portable electronic device 20 to operate, as described above.

If the user wishes to power down the portable electronic device 20 prior to 11:00 P.M., for example, if the user is going to be going to bed early, the user can use the power on/off button to power down the portable electronic device 20 early and thereby conserve the energy stored in the battery 62. In this case, the device 20 powers up automatically at the next scheduled time to power up based on the automatic on/off settings.

Figure 5:
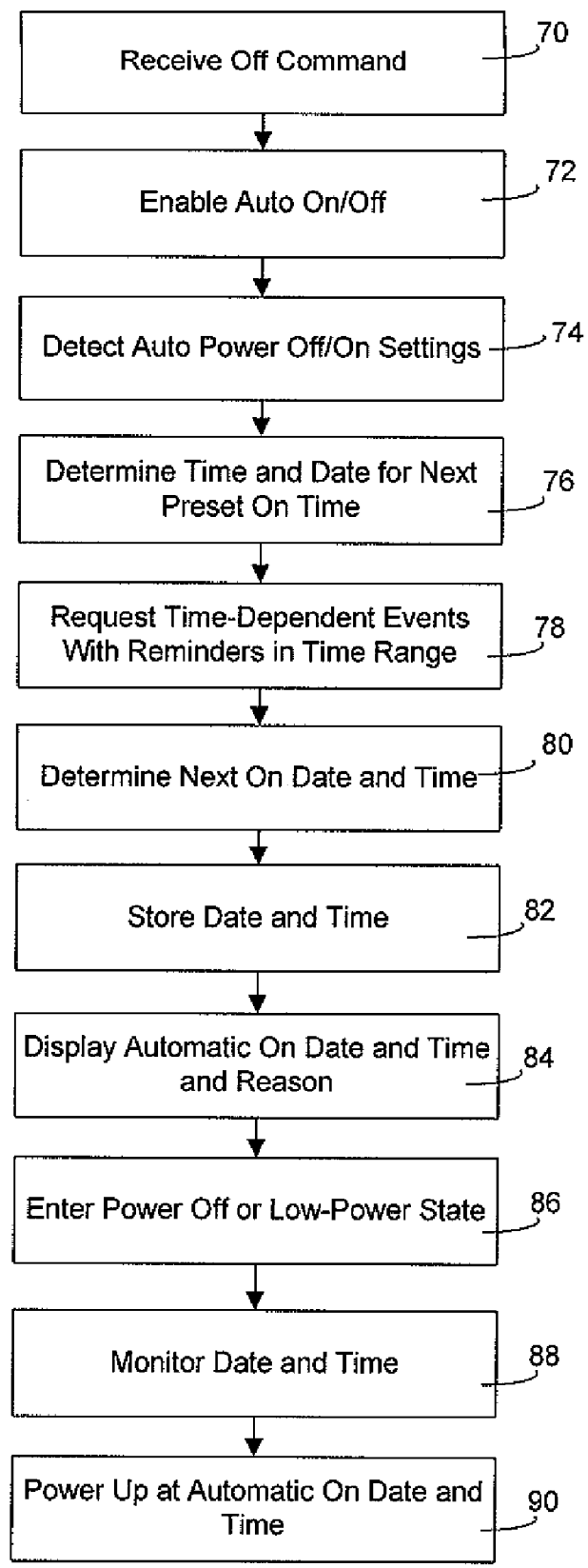
FIG. 5 is a flowchart showing the steps in a method for controlling an electronic device, according to an embodiment.

Reference is now made to FIG. 5 to describe steps in a method for controlling the portable electronic device 20 according to an embodiment. It will be appreciated that each of the steps of FIG. 5 is carried out by routines or subroutines of the portable electronic device software applications 52 executed by the microprocessor 38. Coding of software for carrying out such steps is well within the scope of a person of ordinary skill in the art. The present embodiment will be described by way of example. First, the automatic on/off is enabled by, for example, user enablement of the Enabled fields for both weekdays and weekends, as described above and shown in FIG. 4 (step 70). Thus, an automatic power up and automatic power down is preset by the user. It will be appreciated that the automatic on/off can be enabled in other manners. For example, in other embodiments, the automatic on/off is enabled during manufacture of the portable electronic device 20, or the automatic on/off is enabled in another suitable manner.

With the automatic on/off enabled, the user powers down the portable electronic device by, for example, pressing the power on/off button on the portable electronic device 20, thereby activating the on/off circuitry 54, resulting in the delivery of an interrupt on the interrupt line 58. The interrupt effectively acts as a power down command that is received at the microprocessor 38 of the portable electronic device 20 (step 72).

The portable electronic device 20 detects the automatic on/off setting enabled by the user (step 74) and with the automatic on/off enabled, the preset power-up time is determined based on the automatic on/off settings (step 76). In the exemplary screen shown in FIG. 4, the preset power-up time is set at 7:00 A.M. (for weekdays and weekends). For the purpose of the present embodiment, if the automatic on/off was not enabled, the device enters the power-down state by powering down and does not automatically power up. Thus, the user powers up the device by pressing the power on/off button.

Next, the time-dependent events from the calendar database (or databases) and from the task database (or databases) that meet a date and time range constraint are retrieved (step 78). The date and time range constraint is determined based on the date and time the device is powered-down and the date and time of the next preset power-up time from the automatic on/off settings. From this information, the microprocessor determines if there are any time-dependent events for which a reminder is set for a date and time that falls in the time period between the date and time that the device is powered down and the date and time of the next preset power-up. To accomplish this, the reminder date and time for each of the calendar events for which a reminder is set is determined by subtracting a reminder time duration from a start date and time for each calendar event. It will be appreciated that for each calendar event for which a reminder is set, a reminder time duration is defined as well as a start date and time. For example, a reminder time duration of 15 minutes prior to the start date and time can be set. Thus, a reminder date and time is determined based on the date and time of the calendar event and the reminder time duration defined in the stored calendar event. If the reminder date and time falls within the time period between the date and time that the device is powered down and the date and time of the next preset power-up, the calendar event is retrieved.

In the present embodiment, the reminder date and time for each of the tasks is also determined. If the reminder date and time falls in the time period between the date and time that the device is powered down and the date and time of the next preset power up, the task is retrieved from the task database.

If there are any time-dependent events that meet the constraints, the earliest reminder date and time is determined by comparing the reminder date and time for all of the time-dependent events including the calendar events and tasks that meet the constraints (step 80) and an automatic power-up date and time is set for the date and time of the earliest reminder date and time and stored in memory (step 82). The automatic power-up date and time is stored in any suitable memory. For example, the automatic power-up date and time can be stored in the flash memory 42 or within the internal timer 56.

If, on the other hand, there are no time-dependent events that meet the constraints, the automatic power-up date and time is set for the date and time of the next preset power-up (step 80) and stored in memory (step 82). Again, the automatic power-up date and time is stored in any suitable memory such as, for example, the flash memory 42 or within the internal timer 56.

The automatic power-up date and time and the reason for the automatic power-up is then displayed on the LCD display 24 (step 84). FIG. 6 shows one exemplary screen of the portable electronic device 20 in which the automatic power-up date and time is displayed as the "Next On Time" along with the reason that the portable electronic device 20 is set to power up at the "Next On Time". For exemplary purposes, the automatic power-up date and time is indicated as Tues. Aug. 15, 2006 and the reason is indicated as a reminder for a 9:00 flight. It will be appreciated that this reminder is a calendar event for which a reminder is set for 2 hours and 15 minutes prior to the date and time of the event. If no time-dependent events have reminders set that fall within the time constraint indicated above, the automatic power-up date and time is indicated as the date and time set by the automatic on/off discussed above and the reason is indicated as Auto On/Off. Although the automatic power-up date and time and the reason for the automatic power-up is provided by displaying on the LCD display 24 at step 84 of the present embodiment, it will be understood that the automatic power-up date and time and the reason for the automatic power-up can be provided by other means such as, for example, by an audible message emitted from the portable electronic device 20. Providing the automatic power-up date and time is advantageous as the user of the portable electronic device 20 is not surprised by the automatic power-up and any subsequent reminder that is provided.

The portable electronic device 20 then enters the power-down state (step 86) and continues to monitor the date and time while in the power-down state (step 88). The internal timer 56 keeps track of the current date and time while the portable electronic device 20 is in the power-down state and constantly compares the current date and time that is maintained by the internal timer 56 to the automatic power-up date and time that is stored in memory. When the current date and time reaches the automatic power-up date and time, the internal timer 56 causes the portable electronic device 20 to power up (step 90) by delivering an interrupt on the interrupt line 58 to power up the portable electronic device 20. It will be appreciated that if the portable electronic device 20 automatically powers up as a result of a set reminder, the reminder is provided upon power-up.

In the above-described example, the user powers down the portable electronic device 20 by pressing the power on/off button on the portable electronic device 20, thereby activating the on/off circuitry 54, resulting in the delivery of an interrupt on the interrupt line 58. Rather than the user pressing the power on/off button on the portable electronic device 20, the portable electronic device 20 can automatically power down at a set time according to the present power-down time set in the automatic on/off programming mode.

Figure 7:
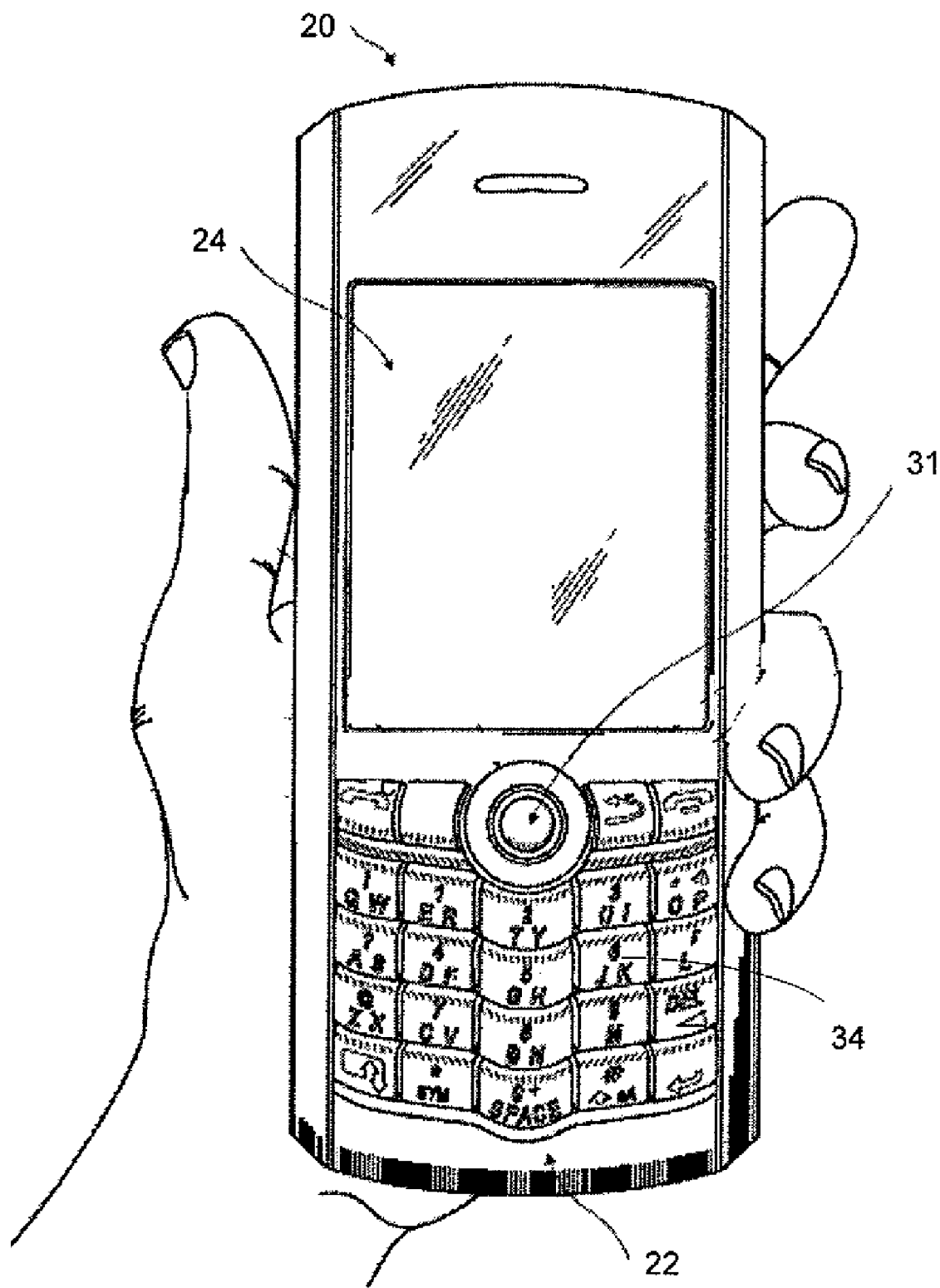
FIG. 7 is a front view of another exemplary portable electronic device.

It will be appreciated that the portable electronic device of FIG. 1 is shown for exemplary purposes only. Other portable electronic devices such as that shown in FIG. 7 are possible. Referring to FIG. 7, another exemplary portable electronic device 20 is shown. The portable electronic device 20 includes a housing 22 that frames an LCD display 24. In the present example, however, the portable electronic device 20 includes a trackball 31, rather than a trackwheel. The trackball can be depressed as a means to provide additional user-input. The microprocessor 38 receives input from the trackball 31 which is used for user selection of features from a list or a table on the LCD display 24 of the portable electronic device 22. Selection is carried out by rolling the trackball to roll a cursor (or highlighted region), for example, to the desired selection and pressing inwardly on the trackball. The portable electronic device 20 shown in FIG. 7 includes many other features, including, for example, a key pad 34 and other features similar to those described above with reference to FIG. 1. It will also be appreciated that reference is made to a trackwheel in the above description for exemplary purposes only, and a trackball 31 such as that shown in FIG. 7 can be used.

According to one aspect, there is provided a method of controlling a portable electronic device includes receiving a power-down command, determining an automatic power-up date and time based on an earliest one of a next preset power-up and a next time-dependent event reminder, entering a power-down state, monitoring a date and time, and automatically powering up at the automatic power-up date and time.

According to another aspect, there is provided a portable electronic device including a housing, a display mounted within the housing, a user input mounted within the housing, a memory mounted within the housing, and a microprocessor within the housing and connected to the memory, the user input and the display for controlling the display. The portable electronic device also includes an application for execution by the microprocessor for receiving a power-down command, determining an automatic power-up date and time based on an earliest one of a next preset power-up and a next time-dependent event reminder; entering a power-down state, monitoring a date and time, and automatically powering up at the automatic power-up date and time.

According to yet another aspect, there is provided a computer program product for controlling a portable electronic device, the computer program product comprising a computer-readable medium having computer-readable code embodied therein. The computer-readable code is for receiving a power-down command, determining an automatic power-up date and time based on an earliest one of a next preset power-up and a next time-dependent event reminder, entering a power-down state, monitoring a date and time, and automatically powering up at the automatic power-up date and time.

Advantageously, the portable electronic device, automatically powers-up based on the earlier one of a preset power-up and a time-dependent event such as a calendar appointment or task with a set reminder. Thus, if a calendar appointment reminder is set for a date and time prior to the date and time of the next preset power-up, the portable electronic device powers up (turns on) and provides the reminder for the user. In another aspect, if the user sets an automatic power-up, the portable electronic device notifies the user prior to going into a power-down state, what the device power-up date and time will be. Thus, if the date and time for power-up of the portable electronic device is prior to the next preset power-up, the display screen will provide an indication to the user that the device will power-up prior to the date and time of the preset automatic power-up, along with an indication of the reason. This way the user is not surprised by the early power-up and reminder from the portable electronic device. Without such an indication, the user may be led to believe that the portable electronic device is not functioning properly.

While the embodiments described herein are described by way of particular examples, it will be understood that modifications and variations to these examples are well within the scope and sphere of the present application. For example, it will be appreciated that the displayed screens can differ. As indicated, the portable electronic device can also differ while still performing the same functions. Many other modifications and variations may occur to those skilled in the art. All such modifications and variations are believed to be within the sphere and scope of the present application.

The invention claimed is:

1. A method of controlling a portable electronic device, comprising:
   receiving a power-down command at a processor of said portable electronic device;
   determining, at said processor, an automatic power-up date and time based on an earliest one of a next preset power-up date and time and a next time-dependent event reminder; said time-dependent event reminder occurring prior to an associated time-dependent event; said time-dependent event occurring before or after said next preset power-up date and time;
   generating, on an output device of said portable electronic device, an output notification indicating said automatic power-up date and time if said next-time dependent event reminder is earlier than said preset power-up date and time;
   entering said portable electronic device into a power-down state;
   monitoring, via said processor, a date and time; and
   automatically powering up said device at the automatic power-up date and time.

2. The method according to claim 1, wherein said output notification comprises providing an indication of the basis for the automatic power-up date and time prior to entering said power-down state.

3. The method according to claim 1, wherein the output notification comprises displaying said indication on a display of the portable electronic device.

4. The method according to claim 1, wherein receiving the power-down command comprises receiving a power-down command from one of a power-down button on the portable electronic device and a preset power-down setting on the device.

5. The method according to claim 1, comprising presetting a power-down/power-up setting on the device prior to said receiving.

6. A portable electronic device comprising:
   a housing;
   a display mounted within the housing;

a user input mounted within the housing;

a memory mounted within the housing;

a microprocessor within the housing and connected to the memory, the user input and the display for controlling the display; and an application for execution by the microprocessor; said application configured for receiving a power-down command, and further configured for determining an automatic power-up date and time based on an earliest one of a next preset power-up date and time and a next time-dependent event reminder; said time-dependent event reminder occurring prior to an associated time-dependent event; said time-dependent event occurring before or after said preset power-up date and time;

said application further configured for generating an output notification indicating said automatic power-up date and time if said next-time dependent event reminder is earlier than said preset power-up date and time;

said application further configured for entering said portable electronic device into a power-down state and monitoring a date and time; said application further configured for automatically powering up at the automatic power-up date and time.

7. The portable electronic device according to claim 6, wherein the application is further configured for displaying an indication of the basis for the automatic power-up date and time on the display, prior to entering the power-down state.

8. The portable electronic device according to claim 6, further comprising an output device for emitting a notification upon automatically powering up if the automatic power-up date and time is based on a time-dependent event reminder time.

9. A computer program product for controlling a portable electronic device, the computer program product comprising a computer-readable medium having computer-readable code embodied therein for:

receiving a power-down command at a processor of said portable electronic device;

determining, at said processor, an automatic power-up date and time based on an earliest one of a next preset power-up date and time and a next time-dependent event reminder;

said time-dependent event reminder occurring prior to an associated time-dependent event; said time-dependent event occurring before or after said next preset power-up date and time;

generating, on an output device of said portable electronic device, an output notification indicating said automatic power-up date and time if said next-time dependent event reminder is earlier than next preset power-up date and time;

entering said portable electronic device into a power-down state;

monitoring, via said processor, a date and time; and automatically powering up said device at the automatic power-up date and time.

10. The computer program product according to claim 9, comprising computer-readable code embodied therein wherein said output notification provides an indication of the basis for the automatic power-up date and time of the portable electronic device, prior to entering the power-down state.

* * * * *

UNITED STATES PATENT AND TRADEMARK OFFICE
CERTIFICATE OF CORRECTION

| | | |
|---|---|---|
| PATENT NO. | : 7,661,004 B2 | Page 1 of 1 |
| APPLICATION NO. | : 11/554168 | |
| DATED | : February 9, 2010 | |
| INVENTOR(S) | : May et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this
Third Day of May, 2011

David J. Kappos
*Director of the United States Patent and Trademark Office*